United States Patent [19]

Fencl

[11] 3,797,531

[45] Mar. 19, 1974

[54] CLAMP AND REINFORCING RING FOR PIPE WRAPPING

[75] Inventor: Vernon R. Fencl, Northbrook, Ill.

[73] Assignee: Grotnes Machine Works, Inc., Chicago, Ill.

[22] Filed: Feb. 22, 1972

[21] Appl. No.: 227,797

[52] U.S. Cl. .................................................. 138/147
[51] Int. Cl. ................................................... F16l 9/04
[58] Field of Search................... 138/109, 150, 147; 285/397, 417, 418, 21; 16/108, 109; 29/508, 516; 292/256.6; 217/91; 248/315; 287/52.06

[56] References Cited
UNITED STATES PATENTS
435,927  9/1890  Ginty .............................. 285/417 X Primary Examiner—Jerry W. Myracle
Attorney, Agent, or Firm—Wolfe, Hubbard, Leydig, Voit & Osann, Ltd.

[57] ABSTRACT

A clamping and reinforcing ring for a pipe wrapped with high strength metal strapping. The clamping and reinforcing ring comprises a unitary metal annulus which is fitted over the wrapped pipe, and having a concave inner surface in the central portion of the annulus. When the wrapped pipe is expanded in the radial direction, the concave portion of the annulus is deformed to increase the radius of curvature and thereby produce a spring force pressing radially inwardly on the wrapped pipe. One or both peripheral portions of the annulus are bent outwardly away from the surface of the wrapped pipe to facilitate fitting of the ring over the wrapped pipe.

3 Claims, 4 Drawing Figures

PATENTED MAR 19 1974 3,797,531

CLAMP AND REINFORCING RING FOR PIPE WRAPPING

The present invention relates generally to pipes wrapped with reinforcing material such as metal strapping or the like and, more particularly, to an improved method and apparatus for the clamping and reinforcing of such wrapped pipe.

It is a primary object of this invention to provide an improved method and apparatus for clamping and reinforcing a wrapped pipe by means of a single unitary metal ring which produces a positive spring force pressing radially inwardly on the wrapped pipe.

It is another object of the invention to provide an improved apparatus of the foregoing type that is simple and economical to fabricate, and which can be assembled by only a few quick, simple operations.

A further object of the invention is to provide such an improved method and apparatus that provides a clamping pressure substantially greater than that effected by a clamp formed by a simple flat band of metal.

Other objects and advantages of the present invention will become apparent from the following detailed description, taken in conjunction with the attached drawings, in which.

While the invention will be described hereinafter in connection with a single illustrated embodiment, it is to be understood that the intent is not to limit it to that embodiment. To the contrary, the intent is to cover all alternatives, modifications and equivalents falling within the spirit and scope of the invention as defined by the appended claims.

Figure 1:
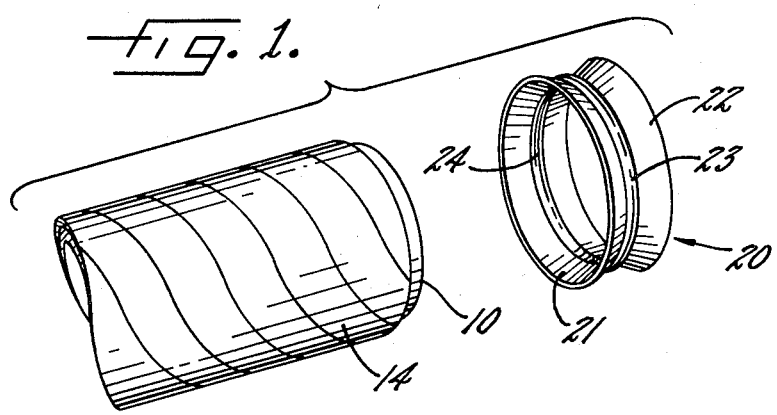
FIG. 1 is a perspective view of a pipe wrapped with metal strapping and a clamping and reinforcing ring ready to be applied to the wrapped pipe.
Figure 2:
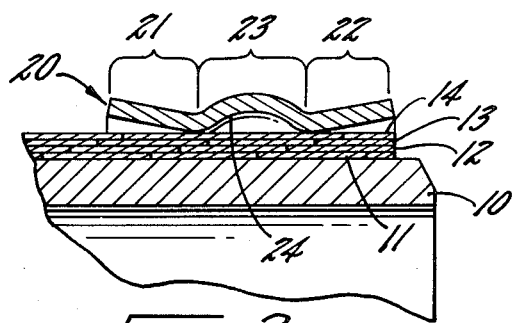
FIG. 2 is an enlarged section through a fragment of one wall of the wrapped pipe of FIG. 1 with the clamping and reinforcing ring applied.

Turning now to the drawings, and referring first to FIGS. 1 and 2, there is shown a pipe 10 having multiple layers 11, 12, 13 and 14 of high strength metal strapping wound around it. The metal strapping reinforces the pipe 10 to reduce the likelihood of fractures in the pipe, and also prevents propagation of a fracture along the length of the pipe if and when a fracture occurs. Each of the layers 11, 12, 13 and 14 of metal strapping is formed by a single strip of strapping wrapped around the pipe 10 in a helical pattern, with the edges of adjacent windings of each helical wrapping abutting each other to form a substantially continuous cylindrical wrapping around the pipe. Wrappings of the type illustrated are especially useful on metal pipes of relatively large diameter of the type used, for example, in gas pipe lines; fractures in such pipe lines have been known to propagate over distances as long as several miles when pipe that was not wrapped was used, resulting in substantial economic losses. Wrapped pipe of the type illustrated may be formed by the method and apparatus described in the assignee's copending application, Ser. No. 227,822, entitled "Method and Apparatus For Wrapping Pipe With Multiple Strips of Strapping" filed concurrently herewith.

Figure 3:
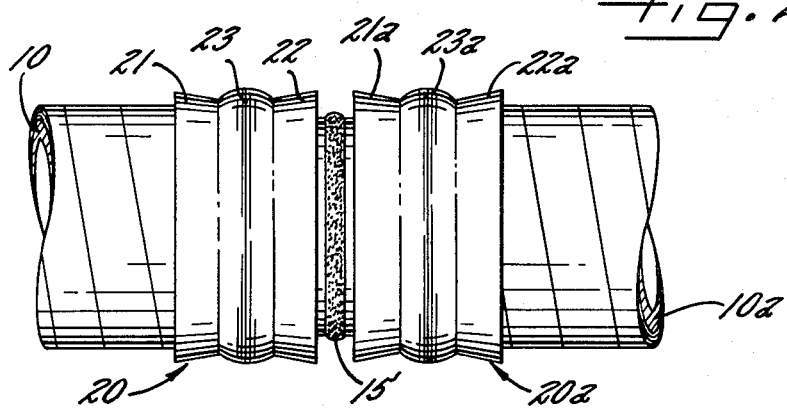
FIG. 3 is a side elevation of the end portions of two sections of wrapped pipe welded together, with each pipe section carrying a clamping and reinforcing ring as shown in FIGS. 1 and 2.
Figure 4:
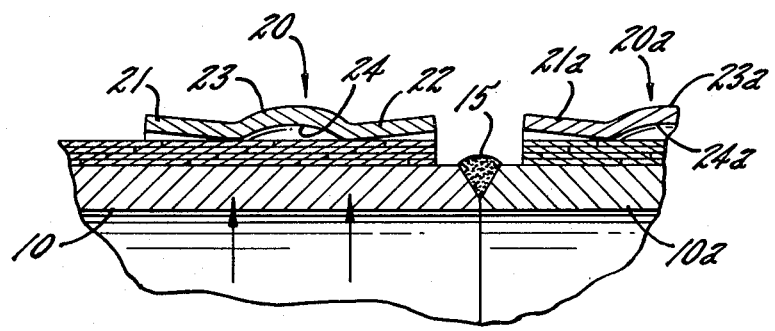
FIG. 4 is an enlarged section through fragments of the welded walls of the pipe sections shown in FIG. 3.

To form pipe lines, successive lengths of the pipe illustrated in FIGS. 1 and 2 are typically joined by welding. Thus, in FIGS. 3 and 4 two sections of wrapped pipe 10 and 10a are butted against each other and welded together as at 15. The heat from the welding operation may weaken the pipe somewhat in the area adjacent the weld, and for this reason fractures are more likely to occur near the ends of the individual lengths of pipe that make up the pipe line.

In accordance with the present invention, the end portion of the pipe 10 and the wrapping thereon are clamped and reinforced by a unitary metal ring or annulus having at least one annular portion forming a concave inner surface spaced away from the peripheries of the annulus, with the annulus being radially expanded to produce a spring force pressing radially inwardly on the wrapped pipe. Thus in the illustrative arrangement, a clamping ring 20 comprises a unitary metal annulus forming a pair of annular peripheral sections 21 and 22 and an annular center section 23 curved outwardly away from the wrapped pipe to form a concave inner surface 24. The ring engages the surface of the wrapped pipe on both sides of the concave surface 24 so that when the pipe 10 is expanded in the radial direction, the center section 23 of the ring is deformed to increase the radius of the curvature thereof, thereby creating a spring force pressing inwardly against the wrapped pipe in the radial direction. That is, the radial expansion of the wrapped pipe deforms the bowed center section 23 from its original configuration, and the tendency of the deformed center section 23 to return to its original configuration produces a radial biasing force applied inwardly against the wrapped pipe.

The radial expansion of the wrapped pipe 10 to deform the clamping ring 20, and thereby achieve the desired clamping action, may be effected by a conventional expanding mandrel, such as the one described in U.S. Pat. No. 3,583,200 to Cvijanovic. The expanding mandrel expands the pipe by applying outward radial forces to the inside wall of the pipe around the entire circumference thereof. When the mandrel is collapsed to remove the expansion forces, the wrapped pipe and the clamping ring both tend to spring back to some degree, and it is important that the clamping ring have a greater radial spring back than the wrapped pipe for the particular expansion effected in any given application so as to maintain the desired spring force on the wrapped pipe. It is also important that the wrapped pipe retain at least a portion of the radial expansion effected by the expanding mandrel, so that the curved center section 23 of the clamping ring remains deformed to some extent to maintain the desired biasing force on the wrapped pipe.

In pipe lines for carrying natural gas or other fluids, the fluid pressure inside the pipe often expands the pipe radially outwardly, particularly near the ends of welded pipe sections where the strength of the pipe may have been reduced somewhat by the heat from the welding operation. In this connection, a further advantage of the ring 20 is that any such radial expansion of the pipe in the field simply deforms the concave center section 23 of the ring to automatically increase the reinforcing force applied by the ring 20. To insure that the ring 20 provides this automatic reinforcing function in the field, it is important that the initial deformation of the cancave ring section 23, when the pipe is first expanded by an expanding mandrel, be such that the ring section 23 retains a concave inner surface. That is, the initial expansion of the wrapped pipe by the expanding mandrel should deform the ring 20 to increase the radius of curvature of the center section 23, but it should not completely flatten the ring so that it no longer has a concave inner surface when the pipe is used in the field.

In accordance with one particular aspect of the invention, at least the periphery of the clamping ring that is located farther away from the end of the wrapped pipe is flared outwardly away from the pipe to facilitate fitting of the ring over the wrapped pipe. Thus, both peripheral sections 21 and 22 of the illustrative ring are bent outwardly away from the wrapped pipe at a light angle so that the inside diameter of the peripheries of the ring are greater than the outside diameter of the wrapped pipe, thereby facilitating the fitting of the ring onto the end of the pipe. The flared periphery also facilitates sliding of the clamping ring 20 axially over the surface of the wrapped pipe without catching on the edges of the successive windings of the outermost layer of metal strapping. Although both peripheral sections 21 and 22 are flared outwardly in the illustrative ring in order to provide a symmetrical structure that can be quickly shipped onto the wrapped pipe without regard to which end of the ring is facing the pipe, it will be understood that only one end of the ring 20 may be bent outwardly if desired.

I claim as my invention:

1. A pipe wrapped with high strength metal strapping and having a clamping and reinforcing ring fitted over the wrapped pipe, said ring comprising a unitary metal annulus having at least one annular portion forming a concave inner surface spaced away from the peripheries of the annulus whereby radial expansion of said annulus deforms said annular portion to produce a spring force acting inwardly in the radial direction, both peripheries of said annulus being bent outwardly in the radial direction, and said annulus having a greater radial spring back than the wrapped pipe over which the annulus is fitted in response to a predetermined radial expansion so that the annulus maintains a spring force on the wrapped pipe after a radial expansion of both the pipe and the annulus.

2. The combination of claim 1 wherein said clamping and reinforcing ring is positioned adjacent one end of the wrapped pipe.

3. The combination of claim 1 wherein said wrapped pipe has two clamping and reinforcing rings fitted thereover, said rings being positioned adjacent the ends of the wrapped pipe.

* * * * *